United States Patent
Delamarche et al.

(10) Patent No.: US 7,907,330 B2
(45) Date of Patent: Mar. 15, 2011

(54) DISPLAY ELEMENT

(75) Inventors: Emmanuel Delamarche, Thalwil (CH); Erich M. Ruetsche, Pfaeffikon (CH)

(73) Assignee: International Business Machines Corporation, Armonk, NY (US)

( * ) Notice: Subject to any disclaimer, the term of this patent is extended or adjusted under 35 U.S.C. 154(b) by 179 days.

(21) Appl. No.: 12/271,135

(22) Filed: Nov. 14, 2008

(65) Prior Publication Data

US 2009/0135471 A1 May 28, 2009

(30) Foreign Application Priority Data

Nov. 14, 2007 (EP) ..................... 07120651

(51) Int. Cl.
*G02B 26/00* (2006.01)
(52) U.S. Cl. ........................ 359/297; 359/290
(58) Field of Classification Search .................. 359/297, 359/242; 362/34, 812
See application file for complete search history.

(56) References Cited

U.S. PATENT DOCUMENTS

| 3,290,669 A * | 12/1966 | Mews ........................... 340/540 |
| 5,406,463 A * | 4/1995 | Schexnayder, Sr. ............ 362/34 |
| 2009/0018413 A1 * | 1/2009 | Santini et al. ................. 600/309 |

OTHER PUBLICATIONS

Glidden, et al, "Bringing long-range UHF RFID tags into mainstream supply chain applications". www.rfdesign.com, pp. 24-36 (even pages) Jul. 2005.
Karjoth, et al, "Clipped RFID Tags Protect Consumer Privacy", ercim-news.ercim.org, Jan. 2007.
Santini, Jr., et al, "A controlled release microchip",Nature. vol. 397, pp. 335-338, Jan. 28, 1999.

* cited by examiner

*Primary Examiner* — Timothy J Thompson
(74) *Attorney, Agent, or Firm* — William Stock; Anne Vachon Dougherty

(57) ABSTRACT

A display element having circuitry adapted to at least partially electrochemically dissolve a first layer by means of supplying an electrical current through the first layer. The first layer separates a first reservoir filled with a liquid from a second reservoir. By dissolving the first layer at least partially, at least a portion of the liquid can flow from the first to the second reservoir. Consequently, the display element transitions from a first to a second optical state.

13 Claims, 5 Drawing Sheets

DISPLAY ELEMENT

FIELD OF THE INVENTION

The invention relates to a display element, a portable device comprising the display element and a method of manufacturing a display element according to the invention.

BACKGROUND

The availability of inexpensive CMOS technologies has created new opportunities for automated material handling within supply chain management. Especially, radio based identification has appeared in a variety of forms in the past decade, from keyless entry batch readers to automatic toll collection to Smartcards.

Radio frequency identification (RFID) is an automatic identification method, relying on storing and remotely retrieving data using devices called RFID tags or transponders. Today, a significant trust in RFID use is in enterprise supply chain management, improving the efficiency of inventory tracking and management. Passive RFID tags have no internal power supply. The electrical current induced in the RFID tag antenna by incoming radio frequency waves provides enough power for the CMOS integrated circuit in the tag to power up and transmit a response. However, often it is necessary to provide together with the RFID tag a possibility to easily enable a user of the RFID tag to check the functionality of said tag for example due to security purposes. See also "Bringing UHF RFID tags into mainstream supply chain applications", by Rob Glidden and John Schroeter, on the rfdesign.com web site in July of 2005.

Assuming for example the scenario that a customer wants to buy a product which is secured by an RFID tag, after having paid for the product at the cash desk, he wants to be sure that the RFID tag has been disabled so he can leave the shop without activating an alarm system just because the RFID tag was accidentally not deactivated by the cashier. One possibility to solve this problem is to install additional RFID check terminals, which enable a customer to check the functionality and activity of an RFID tag just for example before leaving a shop. However, this is rather inconvenient for a customer and also creates additional costs for installing such terminals.

"Clipped RFID Tags Protect Consumer's Privacy" by Guenter Karjoth and Paul Moskowitz, in ERCIM News, January 2007, shows an RFID tag at which consumers can physically separate a part of the tag antenna from the tag. Such separation provides visual confirmation that the tag has been turned into a proximity tag.

In a different context, in "A controlled-release microchip" by John T. Santini Jr. at al., in Nature, Vol. 397, 28 Jan. 1999, a solid-state silicon microchip is reported that can provide controlled release of single or multiple chemical substances on demand which release mechanism is based on the electrochemical dissolution of thin anode membranes covering micro-reservoirs filled with chemicals in solid, liquid or gel form.

Another possibility is to attach special display elements directly to the RFID tag which enable a user of the RFID tag to visually directly check the functionality of the RFID tag. However, since passive RFID tags have no internal power supply and the incoming radio frequency waves which are picked up by the integrated antenna provide just enough power for the CMOS integrated circuit to power up and transmit a response, additional power supplies and special RFID tag readout electronics have to be supplied together with the RFID tag. This may be a solution for extremely expensive goods but not for RFID tags which are attached to low cost mass produced goods.

Therefore, there is a need for a visual display which is cheap and compatible with mass fabrication techniques.

SUMMARY OF THE INVENTION

In accordance with a first aspect of the present invention there is provided a display element, the display element having a first and a second optical state, the display element comprising a first and a second reservoir, a first layer and circuitry, wherein the first reservoir comprises a liquid, the first layer is arranged between the first and the second reservoir, and the circuitry is adapted for at least partially electrochemically dissolving the first layer by means of an electrical current through the first layer for enabling at least a portion of the liquid to flow from the first to the second reservoir thereby enabling the display element to transition from the first to the second optical state.

The display element according to the invention has the advantage, that extremely small electrical currents can be used to change the optical state of the display element. The first layer is designed in such a manner that it can be at least partially dissolved by this small current such that the liquid can flow from the first to the second reservoir.

In accordance with an embodiment of the invention, the display element further comprises a second layer, the second layer being arranged between the first reservoir and the first layer, the second layer comprising at least one first opening, the first opening exposing a first contact area of the first layer to the liquid.

In such embodiment it is preferred that the first layer is adapted to form a draining capillary upon the electrochemical dissolving of the first layer, wherein by means of the electrical current the draining capillary is formed in the first layer at the spatial position of the first contact area. After the draining capillary is formed in such way, the first and the second reservoir are linked via said draining capillary, wherein the first and the second reservoir and the draining capillary are adapted for draining the liquid from the first to the second reservoir through the draining capillary by capillary force.

In an alternative embodiment of the invention, the display element further comprises a draining pipe, wherein the first and the second reservoir are linked via the draining pipe, wherein said draining pipe is closed by the first layer as long as no electrochemical dissolution process has taken place in the first layer. The first and the second reservoir and the draining capillary are adapted for draining of the liquid from the first to the second reservoir through the draining capillary by capillary forces after the first layer was at least partially dissolved.

By using capillary forces between the first and the second reservoir, a liquid flow can be released by an extremely small current flow between the first layer and the liquid, such that the first layer is dissolved and the liquid flows from the first to the second reservoir is driven by the capillary forces. Since capillaries and or pipes are used which are generally described as very narrow tubes or channels through which a fluid can pass, the display element according to the invention can be designed with rather small spatial dimensions. Preferably, the display element has such a size that a person is able to recognize the change from the first to the second optical state of the display element with bare eyes. The unfilled/filled status of the second reservoir is preferably made visible and preferably represents the first or the second optical state respectively.

In accordance with another embodiment of the invention, the display element further comprises at least one venting pipe, wherein the first and the second reservoir and the venting pipe are adapted for pressure compensation between the first and the second reservoir. The pressure difference typically will result from the draining of the liquid from the first to the second reservoir.

The usage of an additional venting capillary between the first and the second reservoir has the advantage that the draining of the liquid from the first to the second reservoir is not slowed down or even interrupted due to a disadvantage pressure difference between the first and the second reservoir.

In accordance with another embodiment of the invention, the display element further comprises a second layer, the second layer being arranged between the first reservoir and the first layer, wherein the second layer further comprises at least one second opening, the second opening exposing a second contact area of the first layer to the liquid. When supplied with the electrical current, a venting capillary is formed in the first layer at the spatial position of the second contact area, wherein the first and the second reservoir and the venting capillary are adapted for a pressure compensation between the first and the second reservoir, the pressure difference resulting from the draining of the liquid from the first to the second reservoir.

In the foregoing embodiment the connection between the first and the second reservoir by means of the venting capillary is not present until the draining capillary is formed, also by means of the electrical current. This prevents an unwanted evaporation of the liquid in the first reservoir such that a drying out of the first reservoir is prevented, since the first reservoir is a closed container.

In accordance with an embodiment of the invention, in a first area around the draining capillary the cross section of the first reservoir is larger than the cross section of the second reservoir and, in a second area around the venting capillary, the cross section of the first reservoir is smaller than the cross section of the second reservoir. With the cross section arrangement, the capillary pressure between the first and the second reservoir is only high enough for the draining capillary. Only the draining capillary is filled by the liquid, whereby the liquid is drained from the first to the second reservoir and the venting capillaries are not clogged by the liquid, such that pressure compensation between the first and the second reservoir can occur during the draining of the liquid from the first to the second reservoir.

In accordance with an embodiment of the invention, the first layer comprises at least one of silver chloride salts, gold, copper, aluminium, titanium, nickel and their oxides. However, preferred is a material which can be oxidized at small potentials, preferably around or below 1 Volt, can easily be handled for mass production purposes, is stable, is highly ductile, makes a good electrical contact and is extremely malleable. A thin first layer consisting of gold unites all the above mentioned features and is also chemically resistant. Such a chemical resistance can be necessary since the pH value of the liquid may have to be lowered to decrease the potential needed for electrodissolution of the first layer.

In accordance with an embodiment of the invention, the liquid is colored or the second reservoir comprises a substance yielding a coloring of the liquid which is drained into the second reservoir. This means, that the ink may contain a soluble colored precursor which is converted into a precipitating reactant upon entering the second reservoir. An example might be the usage of transition metals. A conversion into a precipitating reactant can even be enhanced if the second reservoir is spray coated for example with a catalyst which enhances the conversion. Preferred embodiments are for example enzyme hydrolyzing phosphates, colored aromatic phosphates, hydrolyzed and becoming less polar which leads to a precipitation.

Regarding a coloring of the liquid, it is possible that a water based electrolyte is used which contains pigments, colorants or colored particles. Also, a surfactant may be added to the ink to increase the wetting of the first capillaries such that a draining of the liquid from the first to the second reservoir through the draining capillary is enhanced.

In accordance with an embodiment of the invention, the liquid comprises at least one of chloride and bromide and fluoride salts of alkaline metals and alkaline earth metals.

In accordance with an embodiment of the invention, the first layer is dissolved by means of electrolysis between the first layer and the liquid. It is also possible that the circuitry further comprises a counter electrode, with the counter electrode being in contact with, or preferably immersed in, the liquid, wherein the material of the counter electrode is selected for a permanent electrochemical corrosion process by means of the electrical current through the first layer, the liquid and the counter electrode. This means, that the first layer is dissolved either by a one time electrolysis between the first layer and the liquid by the electrical current through the liquid and the first layer or by a permanent electrochemical corrosion process which permits a display element which after expiration of a time limit due to the successive electrochemical corrosion and therewith draining of the liquid from the first to the second reservoir changes its optical state from the first to the second optical state. This means that an indicator for the durability of a device can be realized.

In accordance with an embodiment of the invention, the circuitry further comprises an antenna, wherein the electrical current originates from an electromagnetic field coupling through said antenna. By using the antenna it is possible to remotely activate the display element according to the invention by coupling an electromagnetic field through said antenna to the display element. With an antenna, an additional power supply is not needed in order to provide the energy or electrical current through the first layer in the liquid. The energy for providing the electrical current for the dissolution process in the first layer is received by the antenna and transformed accordingly. This facilitates the production of such a display element and also reduces the production costs since a power supply can be abandoned.

In accordance with an embodiment of the invention, the first reservoir has at least one first finger extending from the first reservoir. The second layer comprises multiple first openings, wherein the first openings are arranged perpendicular to the extension direction of the first finger. The display element may comprise a set of draining pipes whereby the draining pipes are arranged perpendicular to the extension direction of the first finger. Further, the first openings or the draining pipes are arranged equidistant from each other. The first finger covers a predetermined number of first openings or the first finger covers a predetermined number of the draining capillaries.

In accordance with an embodiment of the invention the same above mentioned principle also holds for the venting capillaries: in this case, the first reservoir has at least one second finger extending from the first reservoir and the second layer comprises multiple second openings, wherein the second openings are arranged perpendicular to the extension direction of the second finger, or wherein the display element comprises a set of venting pipes wherein the venting pipes are arranged perpendicular to the extension direction of the second finger. The second openings or the venting capillaries of the set of venting pipes are arranged equidistant from each other. Further, the second finger covers a predetermined number of second openings or the second finger covers a predetermined number of venting pipes.

Using the first and/or second fingers extending from the first reservoir, as well as the set of openings which are comprised in the second layer, the first reservoir has only to be positioned relative to the set of openings in a coarse manner. By simply fixing the width of the fingers and the inter-distance of the openings, a constant area of capillary openings is always covered by the finger and is in contact with the liquid in the first reservoir. An exact alignment procedure of the fingers with respect to the openings and capillaries is not necessary which eases the fabrication of a display element according to the invention. It has to be mentioned, that preferably always more than one opening or capillary is covered by such a finger. The reason is that, in case one of the capillaries fails which means that either the formation of a capillary may fail or that a dissolving of the respective layer closing the capillary may fail, a further capillary or opening exists through which the liquid can be drained from the first to the second reservoir. In case of failure of one of the openings or capillaries, the only disadvantage of the display element will be that the draining procedure to empty the first reservoir will take a longer time. However, this does not influence the general functionality of the display element according to the invention.

In accordance with an embodiment of the invention, the first opening is hydrophilic or the transition of the draining capillary to the first and/or second reservoir is hydrophilic. Alternatively or additionally, the second opening is hydrophobic or the transition of the venting capillary to the first and/or second reservoir is hydrophobic. Making the capillaries and openings hydrophilic or hydrophobic promotes flow of the fluid from the first to the second reservoir through the draining capillary and prevents clogging of the venting capillaries by the liquid.

Another aspect of the invention relates to a portable device comprising the display element according to the invention. The portable device preferably may comprise control circuitry, wherein the control circuitry comprises a module, wherein the module is adapted for enabling electrical current flow through the first layer and the liquid. Preferably, the portable device is an RFID tag. In this case, the electrical current can originate from the electromagnetic coupling through the antenna which is used to operate the RFID chip circuit. In this case, the control circuitry including the module prevents the accidental activation of the display element by casually exposing the RFID tag antenna to an external electromagnetic field. Only when the electromagnetic field also carries special radio frequency encoded information does the module enable the electrical current flow through the first layer and the liquid such that the optical state of the display transitions from the first to the second optical state. Consequently, the module preferably includes a decoder coupled to a switch for activating the switch upon decoding specified information.

Alternatively, the RFID chip may comprise two different antennas with different resonance frequencies. The first antenna can, in this example, be used to operate the RFID chip circuit as is known in the art. The second antenna, which operates at a different RF frequency, is only used to couple-in electromagnetic waves with said frequency for the only purpose of activation of the display element.

In a further aspect, the invention relates to a method of manufacturing a display element according to the invention. According to such method there is provided a first and a second reservoir, a first layer and a circuitry. The first layer is arranged between an opening of the first reservoir and an opening of the second reservoir. The first reservoir is filled at least partially with a liquid. A circuitry is provided, the circuitry being adapted for at least partially electrochemically dissolving the first layer by means of an electrical current through the first layer for enabling at least a portion of the liquid to flow from the first to the second reservoir, thereby enabling the display element to transition from the first to the second optical state. The individual steps of such methods can be interchange in their order where possible.

Preferably, a second layer is provided on the first layer.

BRIEF DESCRIPTION OF THE DRAWINGS

In the following preferred embodiments of the invention will be described in greater detail by way of example with reference to the drawings in which.

DETAILED DESCRIPTION

Figure 1:
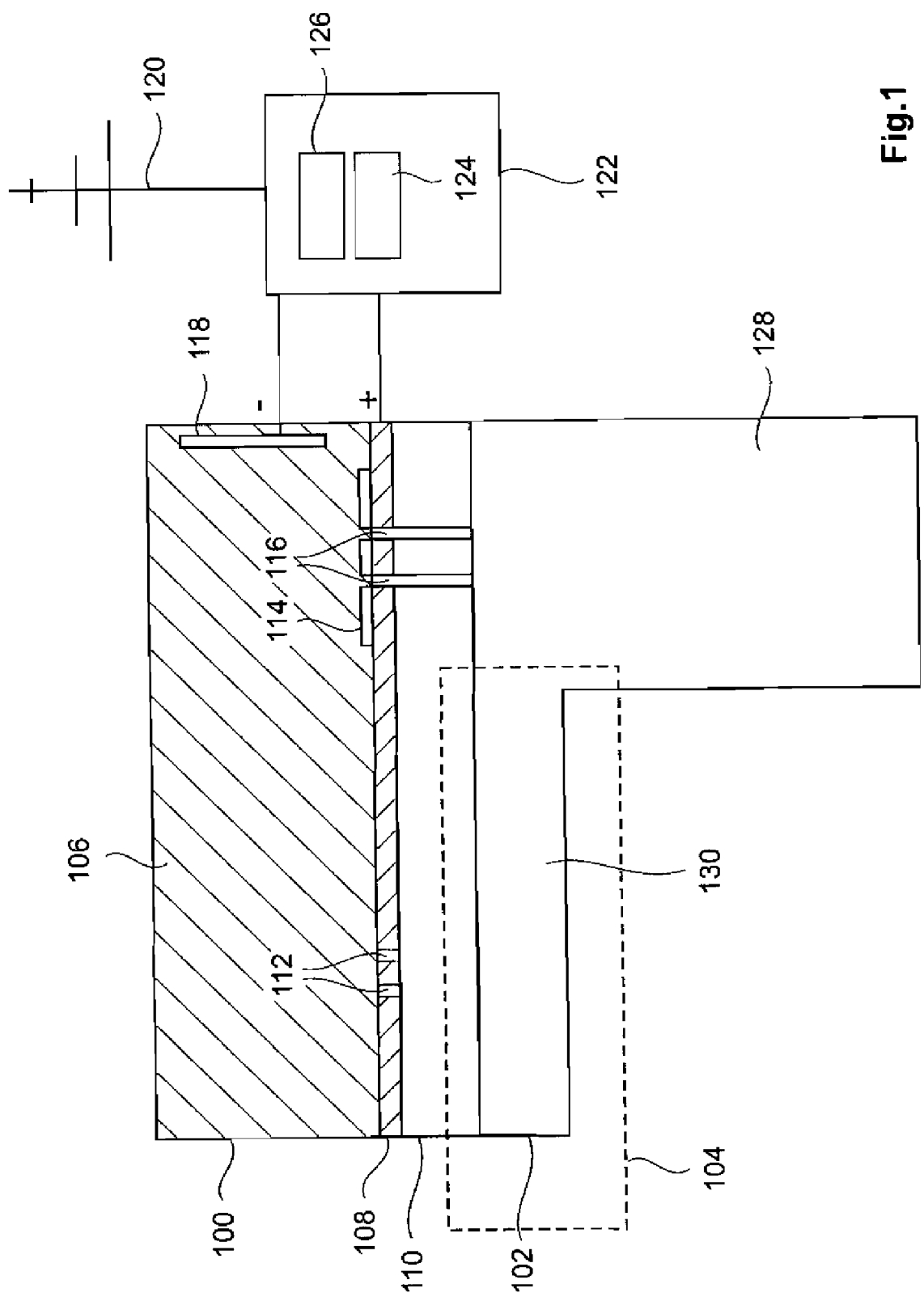
FIG. 1: illustrates an RFID tag comprising a display element that implements one embodiment of the present invention.

FIG. 1 illustrates an RFID tag comprising a display element that implements one embodiment of the present invention. The display element comprises a first reservoir 100 and a second reservoir 102. The first and the second reservoir are separated by a first layer 110, for example a thin gold layer. In order to allow for a draining of a liquid 106 which is contained in the first reservoir 100 into the second reservoir 102, a connection or an opening between the first reservoir 100 and the second reservoir 102 has to be provided. This is done by means of a second layer 108 which is provided in between the first layer 110 and the first reservoir 100. The second layer 108 has two openings 112 such that the liquid 106 is in electrical contact with the first layer 110. By applying a voltage between a counter electrode 118, which preferably is placed within the liquid 106 and the first layer 110, a current flows in between the counter electrode 118, the liquid 106 and the first layer 110. Due to the patterning of the second layer 108, an electrodissolution process only occurs in the first layer 110 at the contact areas between the liquid 106 and the layer 110 in the area of the openings 112. This results in the formation of draining capillaries extending from the openings 112 through the first layer 110 down to the second reservoir 102.

Figure 2:
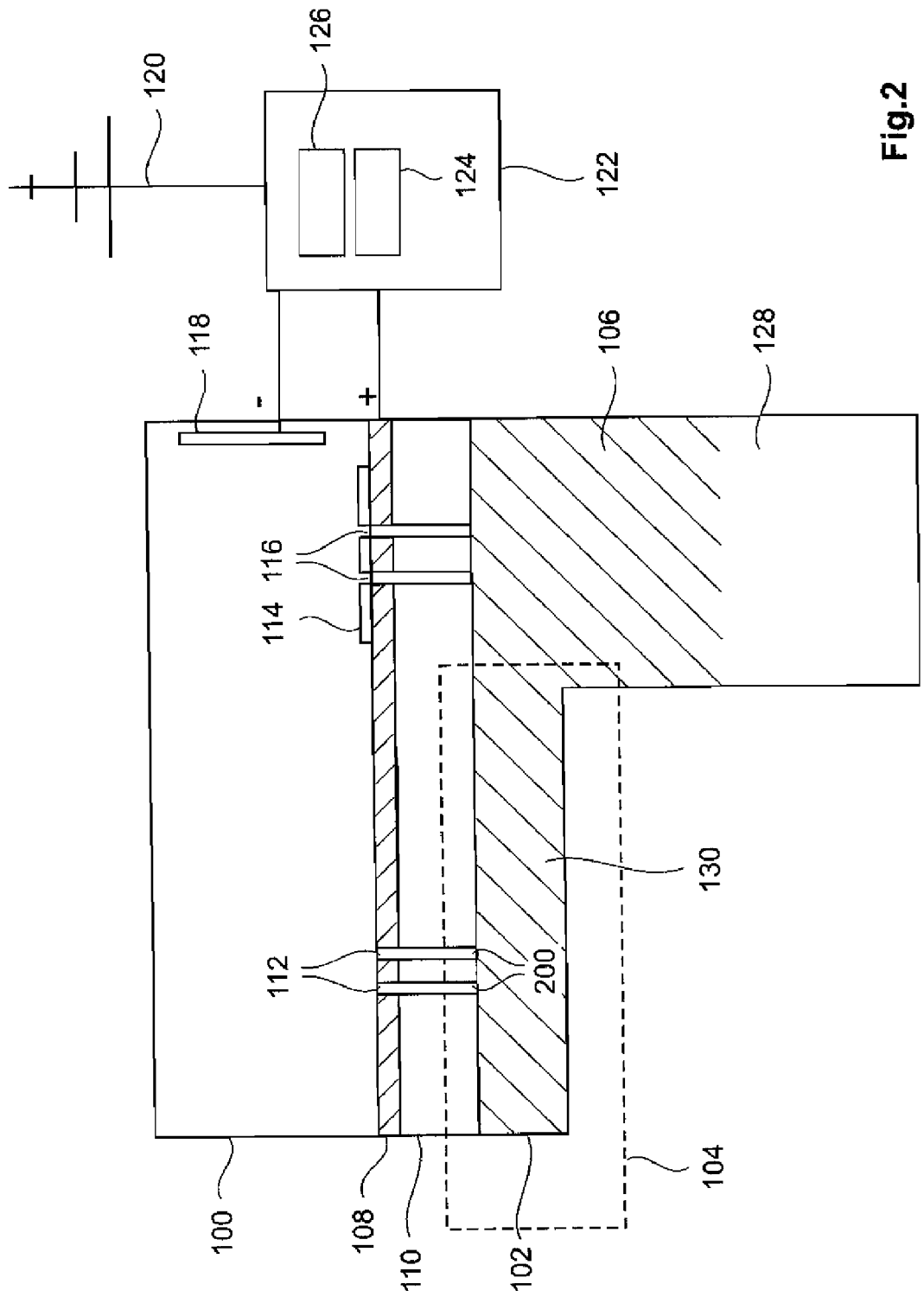
FIG. 2: illustrates an RFID tag comprising an activated display element that implements one embodiment of the present invention.

FIG. 2 illustrates the RFID tag of FIG. 1 comprising an activated display element (i.e., a display element in its second optical state according to an embodiment of the invention). As can be clearly seen, due to the electrolysis process a dissolution has occurred which results in the formation of the draining capillaries 200. Since in an area 128 around the draining capillary 200 the cross section of the first reservoir 100 is larger than the cross section of the second reservoir 102 in area 128, the liquid 106 is drained from the first reservoir 100 to the second reservoir 102. This results in the empty first reservoir 100 in FIG. 2.

An optical window 104 allows a user of the display element to see if the second reservoir 102 is filled with the liquid 106 or not. For this purpose, in order to enhance the visibility of the presence of the liquid 106 in the second reservoir 102, the liquid 106 may be colored or the walls of the second reservoir 102 may be coated with a special substance such that a visible precipitation from the liquid 106 visible within the area of the window 104 occurs.

During the draining of the liquid 106 from the first reservoir to the second reservoir, the air which is present in the second reservoir 102 is displaced. This results in a pressure difference between the first reservoir 100 and the second reservoir 102 which needs to be compensated. This compensation is performed using venting capillaries 116. The diameter of the venting capillaries 116 as well as the cross sections of the first and second reservoir 100, 102 around the areas of the venting capillaries 116 is designed in such a manner, that only air can circulate between the first and second reservoir 100, 102. For example in the area 130 around the venting capillaries 116, the cross section of the first reservoir 100 preferably is designed smaller than the cross section of the second reservoir 102 around the areas of the venting capillaries 116. This means, that a capillary effect for the venting capillaries 116 is prevented.

In order to further prevent an entering of the liquid 106 into the venting capillaries 116 which would clog the venting capillaries 116 such that an air circulation in between the first and the second reservoirs 100, 102 would not be possible anymore, the second layer 108 is additionally coated with a hydrophobic coating 114 in the area around the openings of the venting capillaries 116. Not shown here, but also possible, is a coating of the first layer 110 with a similar hydrophobic coating around the openings of the venting capillaries 116 at their transitions from the first layer 110 to the second reservoir 102. In both cases, the liquid 106 will not come in contact with the venting capillaries 116.

The RFID tag of FIGS. 1 and 2 further comprise a circuitry which comprises an antenna 120 and a chip 122. The chip 122 comprises a processor 124 and a memory 126. For 'normal' end operation of the RFID tag an electrical current induced into the antenna 120 by an external transmitter provides power to operate the chip 122. In response, the chip 122 may for example analyze a signal which is contained in the radio frequency signal and transmit a response by means of the antenna 120.

In an embodiment of the invention, the chip 122 may comprise a module which is adapted to enable the electrical current flow from the counter electrode 118 to the first layer 110 through the liquid 106. The electrical current originates from the electromagnetic coupling through the antenna 120 which is normally used to operate the RFID chip 122.

Regarding an optimal design of the first layer 110, several aspects have to be considered. First, for only a limited time an electrical current is induced through the antenna 120. This means, that only for a limited time a limited number of charge carriers are available. Accordingly, the size of the first layer 110 is preferably optimized in such a way that the induced number of charge carriers is sufficient to form a draining capillary 200. Second, as already mentioned above, it is preferred that at least two draining capillaries 200 be provided in order to rule out a complete malfunction of the display element. In case one draining capillary 200 is not formed sufficiently to allow capillary forces to drain the liquid 106 from the first reservoir 100 to the second reservoir 102, a second venting capillary 200 is provided to allow draining of the liquid from the first to the second reservoir 100, 102.

Another point which needs to be considered is the optimization of the dimensions of the first and second reservoirs and the diameters of the venting capillaries 200. In general, the venting capillaries can have various shaped cross sections including but not limited to, square, rectangular or preferably circular. However, the dimensions of the first and second reservoir and the capillaries must be such that draining of the liquid from the first to the second reservoir occurs within an acceptable amount of time, preferably within at least ten seconds. Here, two effects work against each other: the smaller the radius of the capillaries 200, the faster a formation of the capillaries 200 is possible with the limited amount of electrons provided by the antenna 120. However, with decreasing radii of the capillaries 200 the amount of time required for draining the liquid from the first to the second reservoir increases tremendously. The smaller the radius of the capillaries 200, the higher is the hydraulic friction in the capillaries. The solution to this problem is to use multiple capillaries 200 in parallel. By a parallel arrangement of the capillaries, the total hydraulic resistance of the capillaries is reduced.

A typical device geometry for the display element according to the invention is, for example, a size of $4\times5\times0.2$ mm$^3$ for the first reservoir and $10\times10\times0.05$ mm$^3$ for the second reservoir. Such an arrangement yields a fluid capacity of the first reservoir of 4 µl and a fluid capacity of the second reservoir of 5 µl. The first layer 110 typically has a thickness of 12.5 micrometers and the capillaries 200 have radii of about 6.6 micrometers.

Figure 3:
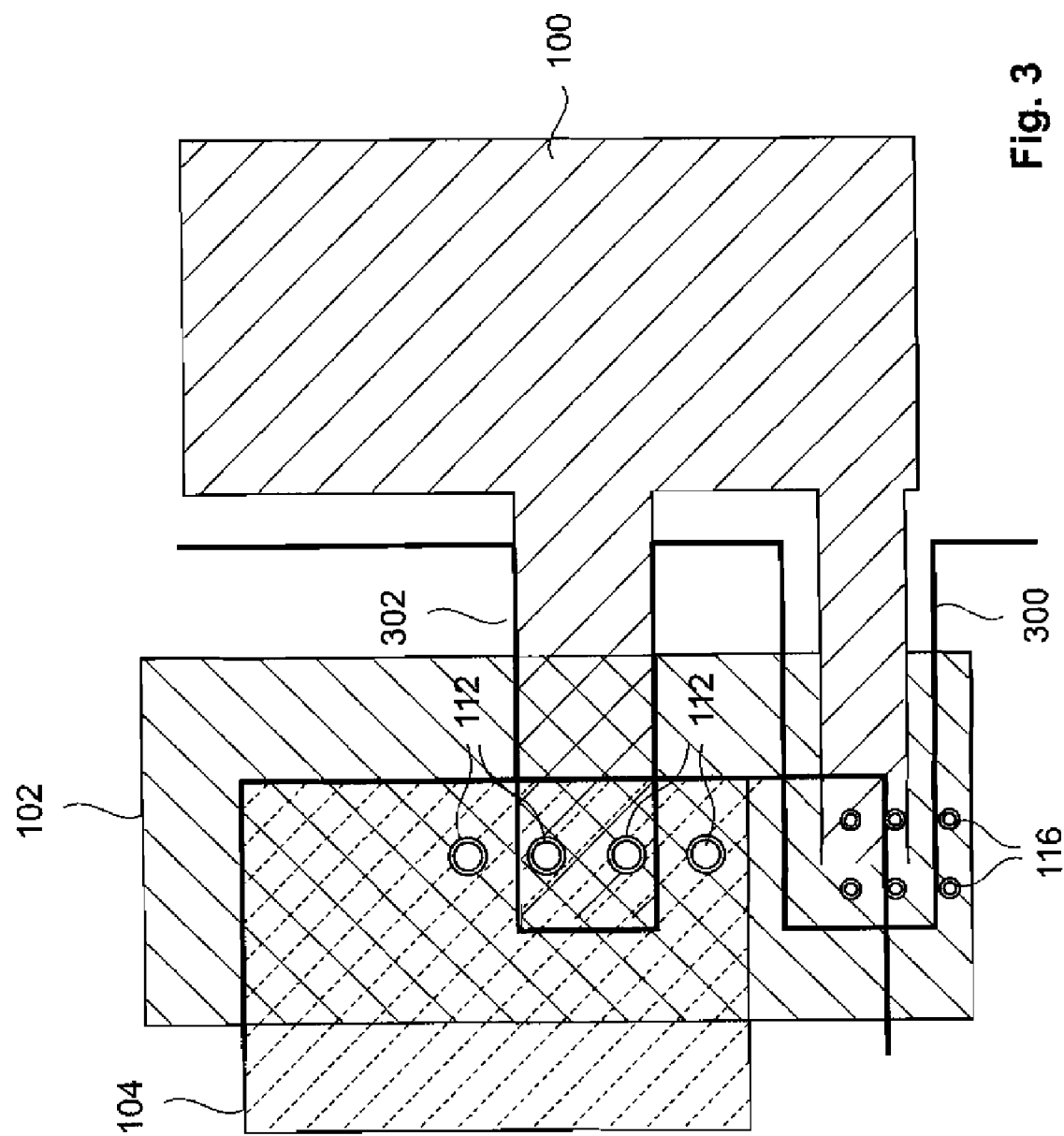
FIG. 3: is a top view of an embodiment of a display element of the present invention.

FIG. 3 is a top view of an embodiment of a display element of the present invention. The display element again comprises the first reservoir 100 and the second reservoir 102. Further, the first reservoir 100 comprises a finger 300 and a finger 302 which extend from the first reservoir 100. The window 104 is located above the second reservoir 102.

FIG. 3 also shows a set of first openings 112 which are located within a second layer, which is not shown in FIG. 3 but is positioned in between the first reservoir 100 and the first layer 110 in the drawing plane. The openings 112 are arranged perpendicular to the extension direction of the finger 302 and the openings 112 are further equidistantly arranged relative to each other.

The same principle idea holds for the venting capillaries 116 or their respective openings, which are also arranged perpendicular to the extension direction of the finger 300 and equidistant from each other. Due to the fixed width of the fingers 300 and 302 and also due to the predetermined distance between the openings of the capillaries 112 and 116, the fingers 300 and 302 can be placed on top of the openings 112 and 116 in a coarse manner, with relatively relaxed tolerances. This means that a highly accurate fabrication of the display element is not necessary since the fingers 300 and 302 will always cover the same areas of the openings 112 and 116. For example, if in FIG. 3 the fingers 300 and 302 would be moved a bit more downward, the first, second and third (starting from the bottom) openings 112 would be covered by the finger 302, however in case of the first and the third opening, these openings would only be for example each covered by 50%. Nevertheless, the total coverage area of the openings 112 would be constant.

Figure 4:
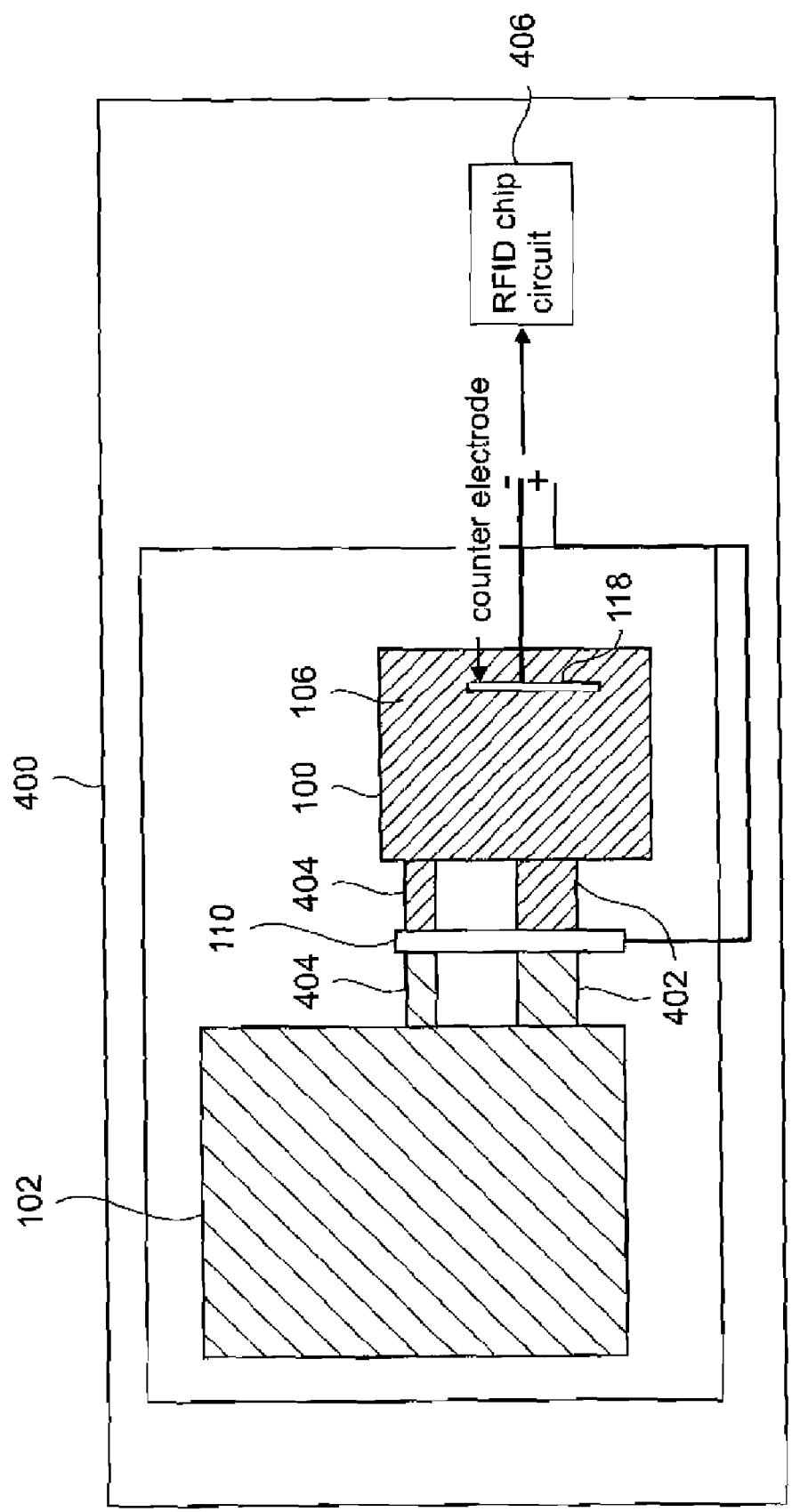
FIG. 4: illustrates a further RFID tag comprising a display element that implements one embodiment of the present invention.

FIG. 4 illustrates a further RFID tag comprising a display element that implements one embodiment of the present invention. The difference between the RFID tag in FIG. 4 to the RFID tags illustrated in FIGS. 1 and 2 is that, in FIG. 4 draining pipes 402 and venting pipes 404 are provided as a link between the two reservoirs 100 and 102. The draining pipes 402 and the venting pipes 404 are closed by the first layer 110. By applying a voltage between the first layer 110 and the counter electrode 118 which is located within the liquid 106, the first layer 112 is dissolved in the contact areas of the draining pipes 402 and the venting pipes 404 which means that, due to capillary forces, the liquid 106 can be drained from the first reservoir 100 to the second reservoir 102 via the pipes and the first layer.

The RFID tag 400 further comprises an RFID chip circuit 406 which, similar to the chip 122 in FIGS. 1 and 2, may comprise a module which enables a current flow from the counter electrode 116 through the liquid 106 to the first layer 110.

The reason for combining the display element with the RFID tag has the advantage that a human is able to read data and get visual information on the state of the RFID device. A visual display of important status information will greatly enhance the usability of the RFID tag and broaden its adoption. The display shown in FIG. 4 is adapted to work only once, such that the draining of the liquid from the first to the second reservoir is irreversible. To a display that is working once only, there can be added safety functions to avoid tampering with the functions of the device (for example, altering the indication of an expiration date on a food product).

Figure 5:
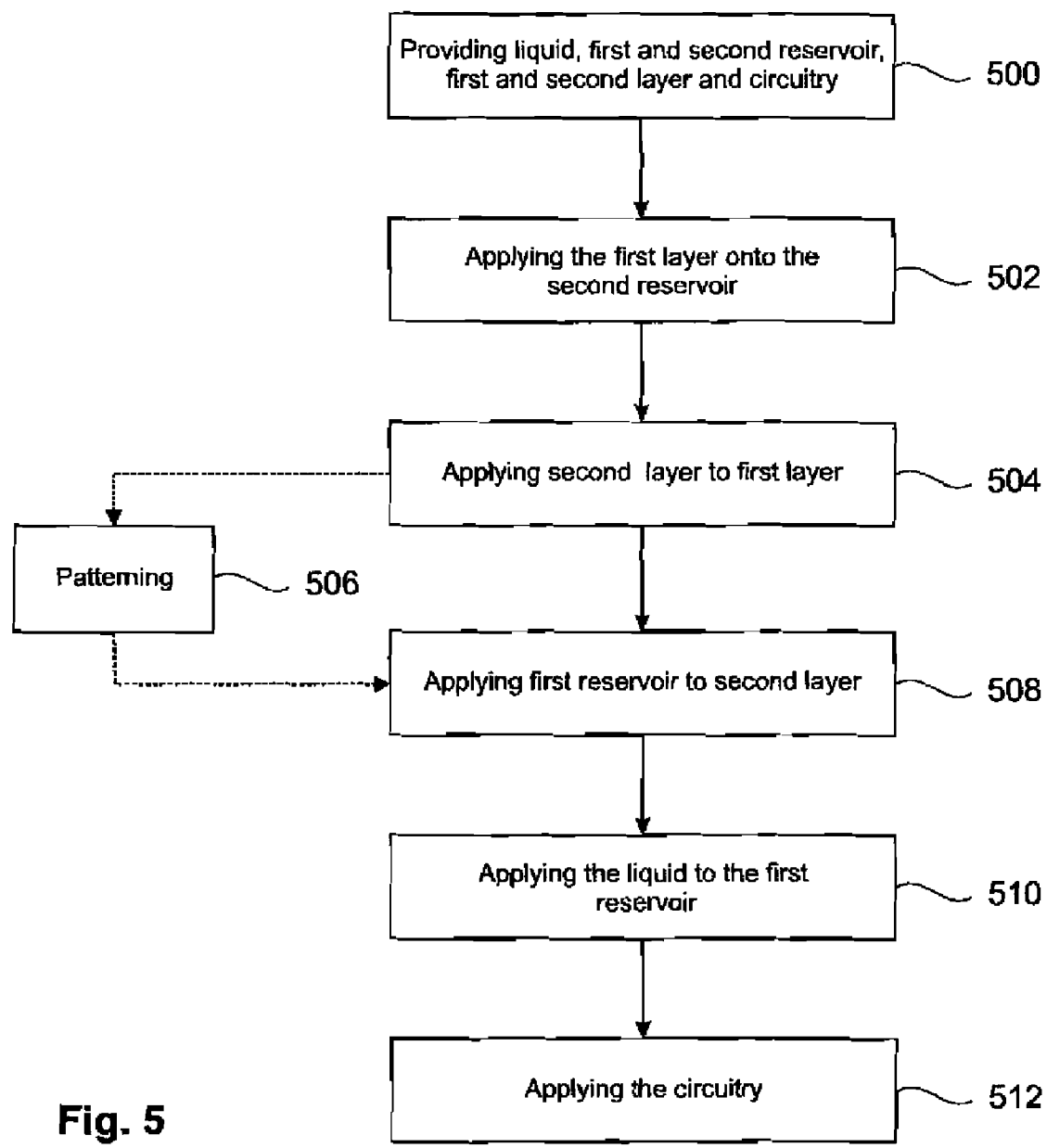
FIG. 5: is a flow chart of a method of manufacturing a display element according to the invention.

FIG. 5 is a flowchart of a method for manufacturing a display element according to the invention. In step 500 a liquid, a first and a second reservoir and a first and a second layer in the circuitry is provided. For example, the first and the second reservoir are made of a cyclic-olefin copolymer (COC) which is chemically resistant, highly impermeable to water, such that ink evaporation is prevented, is transparent, as is preferred for the second reservoir, and can be made opaque, as is preferred for the first reservoir. Further, the material can preferably be oxidized with oxygen plasma to yield wettable surfaces, with the oxidation preferably being done selectively using a mask.

In step 502 the first layer is applied onto the second reservoir. For example, the first layer is made of a gold metal. In step 504 a second layer is applied to the first gold layer. Preferably, the second layer is a laminate like COC, polyurethane, or Kapton.

It is also possible that steps 504 and 502 be combined, such that the first gold, copper or other typical metals be deposited on the second layer using electrolysis deposition, electroplating, spattering or depositing from paste.

Depending on whether or not the second layer is already patterned for providing the openings (e.g. openings 112 in FIGS. 1 and 2), a patterning step 506 may need to be performed, for example by laser milling via a copper vapor laser or by using a mask in combination with an oxidizing plasma. Using the copper vapor laser has advantages since the patterning can be performed extremely fast and the laser beam stops on the metal of the first layer such that the patterning only occurs within the second layer and leaves the first layer undamaged.

In step 508 the first reservoir is applied to the second layer.

This is followed by step 510 where the liquid is applied to the first reservoir.

In a final fabrication step, the circuitry is applied to the fabricated display element, or oppositely the fabricated display element might be integrated in an existing RFID tag.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

The invention claimed is:

1. A display element having a first and a second optical state, the display element comprising:
    a first reservoir for holding a liquid;
    a second reservoir;
    a first layer arranged between the first and the second reservoir, and
    circuitry for applying an electrical current to at least partially electrochemically dissolve the first layer to enable at least a portion of the liquid to flow from the first to the second reservoir thereby enabling the display element to transition from a first to a second optical state, further comprising at least one venting pipe, wherein the first and the second reservoirs and the venting pipe are adapted for a pressure compensation between the first and the second reservoir.

2. A display element having a first and a second optical state, the display element comprising:
    a first reservoir for holding a liquid;
    a second reservoir;
    first layer arranged between the first and the second reservoir, and
    circuitry for applying an electrical current to at least partially electrochemically dissolve the first layer to enable at least a portion of the liquid to flow from the first to the second reservoir thereby enabling the display element to transition from a first to a second optical state,
    further comprising a second layer arranged between the first reservoir and the first layer, the second layer comprising at least one first opening exposing a first contact area of the first layer to the liquid, the second layer further comprising at least one second opening, the second opening exposing a second contact area of the first layer to the liquid.

3. The display element according to claim 1, wherein the first layer comprises at least one of silver, gold, copper, aluminum, titanium, nickel and their oxides.

4. The display element according to claim 1, wherein the liquid comprises at least one of chloride and bromide and fluoride salts of alkali metals and alkaline earth metals.

5. The display element according to claim 1, wherein the first layer is adapted to be dissolved by means of electrolysis between the first layer and the liquid upon supply of the electrical current.

6. A display element having a first and a second optical state, the display element comprising:
    a first reservoir for holding a liquid;
    a second reservoir;
    a first layer arranged between the first and the second reservoir, and
    circuitry for applying an electrical current to at least partially electrochemically dissolve the first layer to enable at least a portion of the liquid to flow from the first to the second reservoir thereby enabling the display element to transition from a first to a second optical state, wherein the circuitry further comprises a counter electrode, wherein the counter electrode is in contact with the liquid and wherein the material of the counter electrode is selected for exhibiting permanent electrochemical corrosion by means of the electrical current through the first layer, the liquid and the counter electrode.

7. A display element having a first and a second optical state, the display element comprising:
    a first reservoir for holding a liquid;

a second reservoir;

a first layer arranged between the first and the second reservoir, and circuitry for applying an electrical current to at least partially electrochemically dissolve the first layer to enable at least a portion of the liquid to flow from the first to the second reservoir thereby enabling the display element to transition from a first to a second optical state, wherein the circuitry further comprises an antenna, wherein the electrical current originates from an electromagnetic field coupling through said antenna.

8. A display element having a first and a second optical state, the display element comprising:

a first reservoir for holding a liquid;

a second reservoir;

a first layer arranged between the first and the second reservoir, and circuitry for applying an electrical current to at least partially electrochemically dissolve the first layer to enable at least a portion of the liquid to flow from the first to the second reservoir thereby enabling the display element to transition from a first to a second optical state, further comprising a second layer arranged between the first reservoir and the first layer, the second layer comprising at least one first opening exposing a first contact area of the first layer to the liquid, wherein the first reservoir comprises at least one first finger extending from the first reservoir and the second layer comprises multiple first openings, wherein the first openings are arranged perpendicular to the extension direction of the first finger; and wherein the first openings are arranged equidistant from each other, and wherein the first finger covers a predetermined number of the first openings.

9. A display element having a first and a second optical state, the display element comprising:

a first reservoir for holding a liquid;

a second reservoir;

a first layer arranged between the first and the second reservoir, and circuitry for applying an electrical current to at least partially electrochemically dissolve the first layer to enable at least a portion of the liquid to flow from the first to the second reservoir thereby enabling the display element to transition from a first to a second optical state, further comprising a draining pipe linking the first and the second reservoir, wherein said draining pipe is closed by the first layer and wherein the first and the second reservoirs and the draining pipe are adapted for a draining of the liquid from the first to the second reservoir through the draining pipe by capillary forces upon an at least partial dissolution of the first layer, wherein the first reservoir comprises at least one first finger extending from the first reservoir, wherein the display element comprises multiple draining pipes, wherein the multiple draining pipes are arranged perpendicular to the extension direction of the first finger, wherein the draining pipes are arranged equidistant from each other, and wherein the first finger covers a predetermined number of the draining pipes.

10. The display element according to claim 2, wherein the first reservoir has at least one second finger extending from the first reservoir, wherein the second layer comprises multiple second openings, wherein the second openings are arranged perpendicular to the extension direction of the second finger, wherein the second openings are arranged equidistant from each other, and wherein the second finger covers a predetermined number of second openings.

11. The display element according to claim 1, wherein the first reservoir has at least one second finger extending from the first reservoir, wherein the display element comprises multiple venting pipes, wherein the venting pipes are arranged perpendicular to the extension direction of the second finger, wherein the venting pipes are arranged equidistant from each other, and wherein the second finger covers a predetermined number of venting pipes.

12. A portable RFID tag device comprising the display element having a first and a second optical state, the display element comprising:

a first reservoir for holding a liquid;

a second reservoir;

a first layer arranged between the first and the second reservoir, and circuitry for applying an electrical current to at least partially electrochemically dissolve the first layer to enable at least a portion of the liquid to flow from the first to the second reservoir thereby enabling the display element to transition from a first to a second optical state.

13. A method of manufacturing a portable RFID tag having a display element, the display element having a first and a second optical state, the method comprising:

providing a first reservoir and a second reservoir;

providing a first layer between an opening of the first reservoir and an opening of the second reservoir;

filling the first reservoir at least partially with a liquid;

providing circuitry adapted for at least partially electrochemically dissolving the first layer by means of an electrical current through the first layer for enabling at least a portion of the liquid to flow from the first to the second reservoir thereby enabling the display element to transition from the first to the second optical state.

* * * * *